United States Patent [19]

Inaba et al.

[11] Patent Number: 5,709,106
[45] Date of Patent: Jan. 20, 1998

[54] CONDENSER STRUCTURE WITH LIQUID TANK

[75] Inventors: Hiroyuki Inaba; Hiroaki Hashimoto; Hideo Kobayashi; Naohisa Kamiyama; Yutaka Moriyama, all of Tokyo, Japan

[73] Assignee: Calsonic Corporation, Tokyo, Japan

[21] Appl. No.: 734,030

[22] Filed: Oct. 18, 1996

[30] Foreign Application Priority Data

| Oct. 18, 1995 | [JP] | Japan | 7-269745 |
| Oct. 18, 1995 | [JP] | Japan | 7-269746 |
| Oct. 18, 1995 | [JP] | Japan | 7-270036 |
| Mar. 18, 1996 | [JP] | Japan | 8-060867 |
| Aug. 7, 1996 | [JP] | Japan | 8-208194 |
| Aug. 7, 1996 | [JP] | Japan | 8-208195 |
| Aug. 9, 1996 | [JP] | Japan | 8-211129 |

[51] Int. Cl.$^6$ .......................... F25B 39/04
[52] U.S. Cl. .......................... 62/507; 62/509
[58] Field of Search .................. 62/506, 507, 509

[56] References Cited

U.S. PATENT DOCUMENTS

| 5,088,294 | 2/1992 | Ando | 62/509 |
| 5,159,821 | 11/1992 | Nakamura | 62/509 |
| 5,228,315 | 7/1993 | Nagasaka et al. | 62/509 |
| 5,419,141 | 5/1995 | Burk | 62/509 |
| 5,435,153 | 7/1995 | Hutchison et al. | 62/474 |
| 5,546,761 | 8/1996 | Matsuo et al. | 62/509 |
| 5,592,830 | 1/1997 | Baba et al. | 62/509 |
| 5,628,206 | 5/1997 | Baba | 62/509 |

FOREIGN PATENT DOCUMENTS

| 0 480 330 | 4/1992 | European Pat. Off. | F25B 45/00 |
| 0 669 506 | 8/1995 | European Pat. Off. | F25B 39/04 |
| 2 395 481 | 6/1977 | France | F28F 21/06 |
| 42 38 853 | 5/1994 | Germany | F28B 1/02 |
| 5-164433 | 6/1993 | Japan | F25B 43/00 |
| 6-2992 | 1/1994 | Japan | F25B 43/00 |
| 6-94329 | 4/1994 | Japan | F25B 39/04 |

*Primary Examiner*—William E. Tapolcai
*Attorney, Agent, or Firm*—Sughrue, Mion, Zinn, Macpeak & Seas, PLLC

[57] ABSTRACT

A condenser and a subcondenser are provided between a couple of header pipes, and a liquid tank is provided by the side of the header pipe. Liquid refrigerant that is discharged from the condenser enters the subcondenser after passing through the liquid tank. The liquid tank is detachably mounted on the header pipe.

17 Claims, 14 Drawing Sheets

FIG. 8(A)
FIG. 8(B)
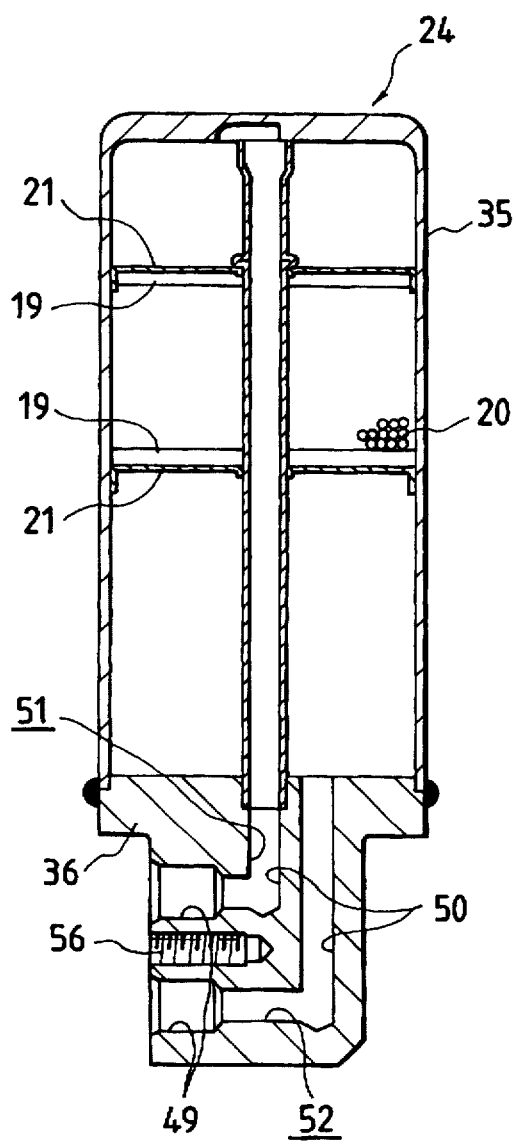
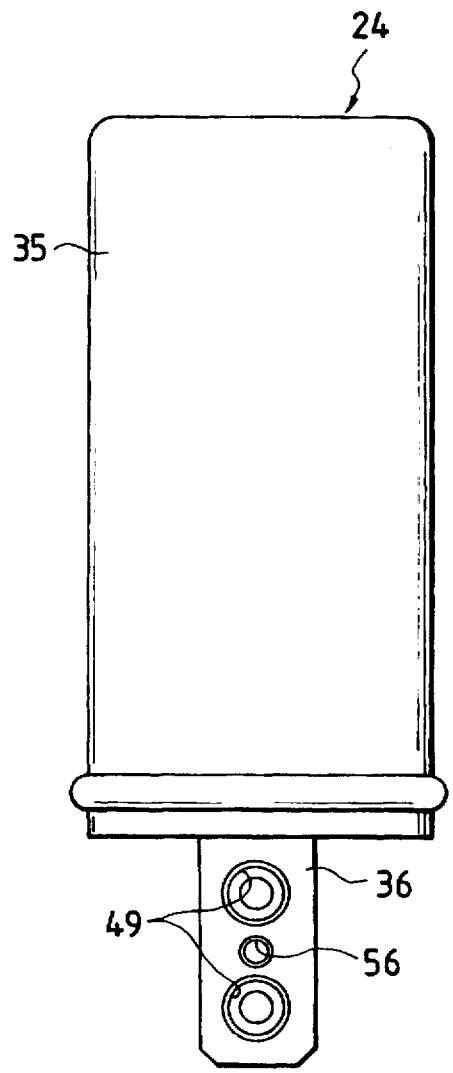

CONDENSER STRUCTURE WITH LIQUID TANK

BACKGROUND OF THE INVENTION

1. Field of the Invention

The present invention relates to a condenser structure with a liquid tank, which is used with a vapor compressing type refrigerator for car air conditioners. The condenser is connected in series between a compressor and an evaporator, and condenses refrigerant to radiate heat from the refrigerant, removes the water content and foreign materials from the refrigerant, and then feeds the clean refrigerant to the evaporator.

2. Description of the Related Art

A refrigerator of the vapor compressing type is incorporated into a car air conditioner for controlling temperature in a car room and dehumidifying air in the car room. This type of the refrigerator is disclosed in Japanese Patent Publication No. Hei. 4-95522. A circuit diagram showing the basic construction of the refrigerator is shown in FIG. 18. In the figure, gaseous refrigerant at high temperature and high pressure is discharged from a compressor 1 and passes through a condenser 2. When passing through the condenser, a heat exchange between the refrigerant and air is performed, so that the refrigerant is decreased in temperature, condensed and liquidized. The resultant liquid refrigerant is temporarily stored in a liquid tank 3, and then fed to an evaporator 5 through an expansion valve 4. In the evaporator 5, the liquid refrigerant is evaporated. In the process of evaporating the refrigerant, the evaporator temperature decreases as the result of absorbing the latent heat. Accordingly, if air to be air conditioned is applied to the evaporator 5, temperature of the air decreases and the air is dehumidified. The refrigerant evaporated in the evaporator 5 is sucked by the compressor 1. Then, the refrigerating cycle is repeated.

In the vapor compressing type refrigerator for car air conditioners, the liquid tank 3 is manufactured separately from the condenser 2, and placed in the middle of the pipe which connects the condenser 2 to the evaporator 5. In the case of the refrigerator in which the condenser 2 and the liquid tank 3 are separately provided, a large space is required for installing the liquid tank 3 therein, and vibration-proof measures must be taken for the condenser 2 and the liquid tank 3, respectively.

To solve those problems, there are many proposals as disclosed in Japanese Patent Publication Nos. Hei. 3-87572, 4-103973, 4-131667, and the like. The proposal disclosed in Japanese Patent Publication No. Hei. 4-103973 is schematically shown in FIG. 19. As shown, a condenser 2 includes a couple of header pipes 6a and 6b which are extend vertically (when viewed also in FIG. 19) and spaced horizontally (when viewed in FIG. 19). A plural number of flat heat transferring pipes 7 are disposed between the couple of the header pipes 6a and 6b. These flat heat transferring pipes 7 are horizontally extended and vertically spaced. Both ends of the heat transferring pipes 7 are air- and liquid-tightly coupled with the header pipes 6a and 6b so that the inner flow passages of the flat heat transferring pipes 7 communicate with the inner sides of the header pipes 6a and 6b, respectively. Corrugated fins 8 formed of zig-zagged thin metal plate are located between the adjacent flat heat transferring pipes 7, to thereby form a core section 9. Side plates 10 and 11 are provided on the upper and lower sides of the core section 9, respectively. The both end portions of the side plates 10 and 11 are fastened to the inner sides of the upper and the lower ends of the header pipes 6a and 6b, respectively.

In the thus constructed condenser 2, the core section 9 effects heat exchange between the refrigerant flowing through the flat heat transferring pipes 7 and air flowing along the flat heat transferring pipes 7, and condenses and liquidizes the refrigerant. Gaseous refrigerant is fed into an inlet pipe 12, which is provided at the top of the header pipe 6a (located on the right side in FIG. 19). The refrigerant flows between the header pipe 6a and the header pipe 6b (located on the left side in FIG. 19) in going/returning manner, through the flat heat transferring pipes 7 of the core section 9. During this flow of the gaseous refrigerant, the refrigerant is condensed and liquidized. The resultant liquid refrigerant is gathered in the lower end of the header pipe 6a, and fed through a refrigerant transporting pipe 13 to the liquid tank 3.

The liquid tank 3 is fastened onto the outer surface of the header pipe 6a. Specifically, a cylindrical case 14, which defines the liquid tank 3, is fastened to the side wall of the header pipe 6a by means of hard soldering or brazing. An opening of the bottom of the case 14 is closed with a bottom plate 15, while an opening of the top of the case 14, with a top plate 16. The refrigerant transporting pipe 13 is inserted through the bottom plate 15 into the case 14 so as to extend passing through the axis of the center of the case. A cylindrical space 18 is formed between the outer surface of the refrigerant transporting pipe 13 and the inner surface of the case 14. A number of small holes 17 are perforated in the upper portion of the refrigerant transporting pipe 13 that is located in the upper portion of the case 14. Liquid refrigerant, which was fed from the header pipe 6a to the refrigerant transporting pipe 13, may flow out through the small holes of the refrigerant transporting pipe 13. In the mid portion of the cylindrical space 18, a filter 19, a drying agent 20 and a porous holder plate 21 are stacked in this order when counted from the lower side. The filter 19 is made of porous material, such as felt, and has a function to filter foreign materials, for example, dust. The drying agent 20 is made of silica gel, calcium chloride, or the like. The porous holder plate 21 is formed with a wire net, punching metal, or the like. An outlet pipe 22 is provided at the lower end of the case 14. The liquid refrigerant, which is gathered in the lower end of the cylindrical space 18, flows out through the outlet pipe 22.

In operating the liquid-tank combined condenser thus constructed (or the vapor compressing type refrigerator having such a condenser incorporated thereinto), the refrigerant flows in the direction of arrows, and is condensed and liquidized in the condenser 2 and then is fed to the liquid tank 3. The water content, foreign material and the like are removed from the refrigerant in the liquid tank 3, and the refrigerant thus made clean is discharged through the outlet pipe 22 into the expansion valve 4 located in the pre-stage of the evaporator 5 (see FIG. 18). The liquid-tank condenser thus constructed and operated is advantageous in that the condenser 2 and the liquid tank 3 may be handled as one body. Accordingly, it may readily be installed in a limited space within an engine room. One vibration-proof measure suffices for both the condenser 2 and the liquid tank 3. In other words, there is no need of taking the vibration-proof measures for the condenser and the tank, respectively. In this respect, the installing work of the condenser is easy.

A subcondenser is provided between the liquid tank 3 and the evaporator 5 in some conventional refrigerators of the vapor compressing type, in order to improve the performances of the refrigerator. Such a construction is able to sufficiently cooling the refrigerant in the condenser 2, and then feeding it to the evaporator 5. Japanese Patent Publication No. Hei. 3-87572 discloses such a structure that the condenser, the liquid tank, and the subcondenser are coupled into a unit.

The conventional liquid-tank combined condenser thus constructed and operated is disadvantageous in that it is impossible to detach the liquid tank 3 from the condenser when the liquid tank 3 is repaired or replaced with another. In other words, when the liquid tank 3 is abnormal and it must be removed for finding its cause and repair the tank, the condenser 2 must be removed together with the tank. This makes the maintenance work of the liquid tank 3 difficult, and increases the maintenance cost. The same thing is correspondingly applied to the invention disclosed in Japanese Patent Publication No. Hei. 3-87572.

Such a structure that the liquid tank is detachable from the condenser is disclosed in Japanese Patent Publication No. Hei. 4-131667. Because of the structure inherent in the invention of the publication, it is impossible to mount the subcondenser and the condenser in one united body. In other words, the subcondenser must be mounted separately from the condenser and the liquid tank. This is troublesome.

Further, in the liquid-tank combined condenser thus constructed and operated, it is difficult to install the condenser in immediate proximity to the front of the radiator. In the vapor compressing type refrigerator for car air conditioner, the condenser 2 is frequently installed in immediate proximity to the front of the radiator for radiating heat from the cooling water. The outside diameter of the case 14 that forms the liquid tank 3 is much larger than that of the header pipe 6a to which the case 14 is fastened. Accordingly, the rear part of the liquid tank 3 is protruded rearward from the rear side of the condenser 2. When the condenser is installed in close proximity to the front of the radiator, the liquid tank 3 interferes with the radiator. This makes it difficult to install the condenser in close proximity to the front of the radiator for the cooling water heat radiation.

Japanese Patent Publication No. Hei. 7-159000 discloses a condenser in which one of the header pipes and the case of the liquid tank are formed in one piece construction by extrusion molding. In the disclosed condenser, the case of the liquid tank is displaced to the front with respect to the header pipe.

The condenser disclosed in Japanese Patent Publication No. Hei. 7-159000 does not suffer from the above-mentioned problem on the installation of the condenser, but suffers from the following problems. Usually, a removal means for removing foreign materials from the refrigerant is provided within the case of the liquid tank. It is difficult to stably hold the removal means within the one-piece molded case. Delicate and careful work is required for obtaining a condenser with a liquid tank containing the removal means. Such work increases the cost of manufacturing the condenser. A shape of the one-piece molded body uniquely determines a configuration of the header tank and the liquid tank when these are combined. In this respect, design freedom is limited.

Furthermore, in case where hard soldering is used as described above, when the hard soldering is carried out, temperature rises in the liquid tank slower than in the remaining portion since the heat capacity of the liquid tank is larger than of the remaining portion. The soldering of the hard soldered portion is often defective. The defective soldering takes place at the connections of the component parts of the liquid tank also in case where the liquid tank and the header pipe are connected by using a bracket.

SUMMARY OF THE INVENTION

An object of the present invention is to provide a condenser structure with a liquid tank to solve the above problems.

According to a present invention, there is provided a condenser structure with a liquid tank comprising: (1) a condenser including: a pair of header pipes spaced from each other; a plural number of heat transferring pipes disposed between the pair of header pipes so as to be spaced from each other, both ends of the heat transferring pipes being opened to an inside of the header pipes; and fins disposed between the adjacent heat transferring pipes spaced from each other; and (2) a liquid tank fastened to the first header pipe so as to receive a liquid refrigerant discharged from a discharging port of the condenser; wherein means are provided for coupling the first header pipe and liquid tank with each other detachably in such a manner that a liquid refrigerant flowing passage is formed so as to be air- and liquid-tight.

The condenser structure with a liquid tank according to the present invention may further comprise: a subcondenser including: a pair of end portions of the pair of header pipes; a subheat-transferring pipe for communicatively interconnecting the pair of end portions of the header pipes; and subfins disposed along the subheat-transferring pipes; wherein the condenser, liquid tank and subcondenser may be coupled in series in a refrigerant flow direction, air- and liquid-tightly.

A center axis of the liquid tank may be displaced in front of a center axis of the first header pipe.

The liquid tank may be made of metal of good thermal conductivity, and radiating fins for promoting a heat exchange between said liquid tank and air may be formed on an outer surface of said liquid tank.

BRIEF DESCRIPTION OF THE DRAWINGS

In the accompanying drawings:

FIGS. 8(A) and 8(B) show a liquid tank used in a fourth embodiment of the present invention, wherein FIG. 8(A) is a sectional view and FIG. 8(B) is a side view of the liquid tank;

DETAILED DESCRIPTION OF THE PREFERRED EMBODIMENTS

1st Embodiment

FIGS. 1 to 5 show a first embodiment of the present invention. The first embodiment is characterized by the following two points.

Figure 1:
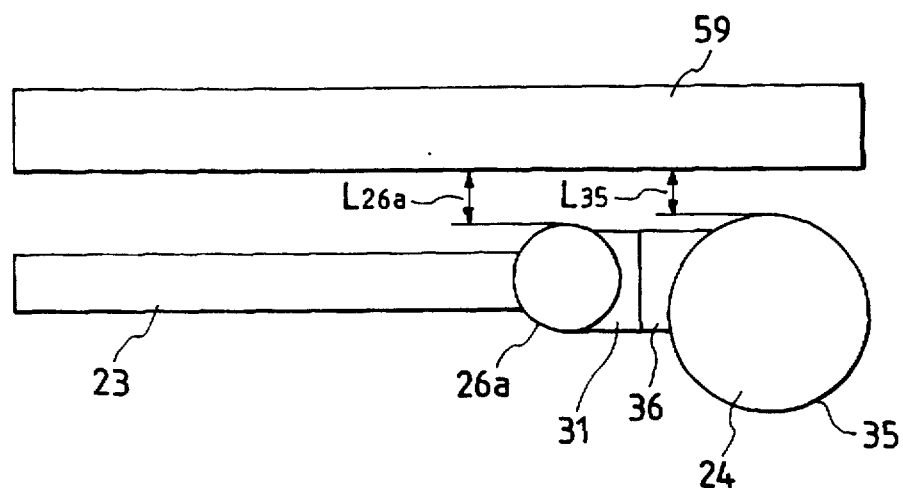
FIG. 1 shows a top plan view of the condenser structure of a first embodiment of the present invention.

As schematically shown in FIG. 1, a case 35 forming a liquid tank 24 is fixedly disposed by the side of a header pipe 26a of a condenser 23 in a state that the center axis of the case 35 is displaced to the front (lower side in FIG. 1) with respect to that of the header pipe 26a. A distance $L_{26a}$ between the rear side (upper surface thereof in FIG. 1) of the header pipe 26a and the front side of the radiator 59 (lower surface thereof in FIG. 1) is nearly equal to a distance $L_{35}$ between the rear surface of the case 35 and the front face of the radiator 59 ($L_{26a} \approx L_{35}$).

Figure 2:
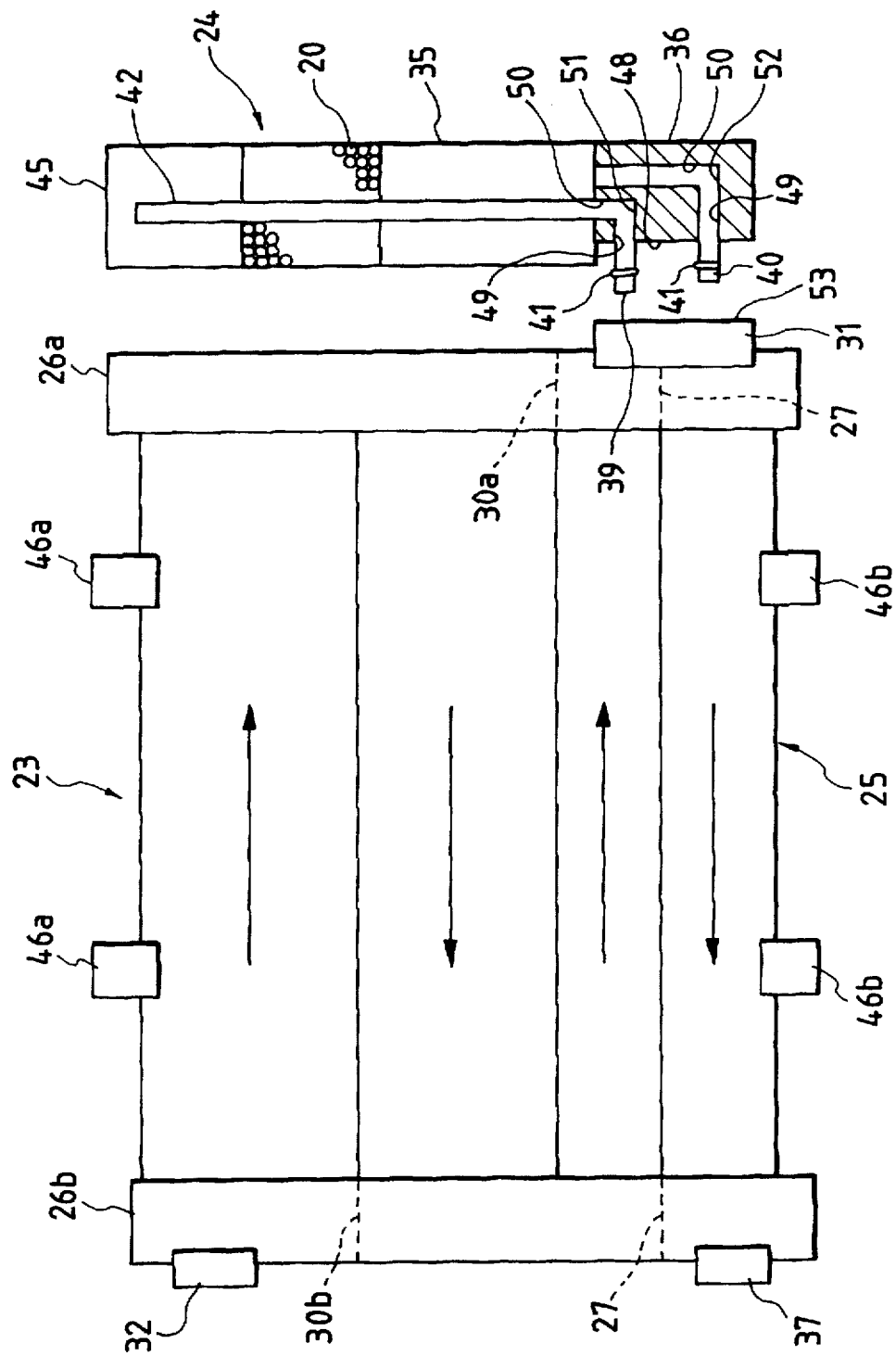
FIG. 2 shows a front view showing a condenser structure according to the first embodiment, wherein the liquid tank is removed from the condenser structure.

As schematically shown in FIG. 2, the condenser 23, the liquid tank 24 and a subcondenser 25 are disposed in series from a higher part of a refrigerant flow to a lower part thereof with respect to the refrigerant flowing direction of arrows. The subcondenser 25 is disposed under the condenser 23, and the liquid tank 24 is disposed by the side of the condenser 23 and the subcondenser 25. That is, the invention is applied to a condenser structure combined with a subcondenser and a liquid tank in one united block (the condenser structure will be referred to a liquid-tank/subcondenser combined condenser structure). The condenser and the subcondenser are both of the so-called horizontal flow type in which refrigerant horizontally flows between a couple of header pipes. In the condenser structure of the embodiment, as shown in FIG. 2, a condenser 23, a liquid tank 24 and a subcondenser 25 are disposed in series from a higher part of a refrigerant flow to a lower part thereof with respect to the refrigerant flow direction of arrows. The subcondenser 25 is located under the condenser 23, and the liquid tank 24 is located by the side of those condensers.

The condenser 23 and the subcondenser 25 are constructed including a couple of header pipes 26a and 26b horizontally spaced. Within the header pipes 26a and 26b, the partitioning walls 27 are respectively provided in the lower portions thereof, while air- and liquid-tightly partitioning the inside of these pipes. The upper section including the portions of the header pipes 26a and 26b above the partitioning walls 27 forms the condenser 23, while the lower section including the portions of the header pipes below the partitioning walls 27 forms the subcondenser 25. In the embodiment under discussion, each of the header pipes 26a and 26b comprise a couple of components, one placed inside another. Each of the header pipes 26a and 26b may comprise a single component and be cylindrical in shape.

Figure 3:
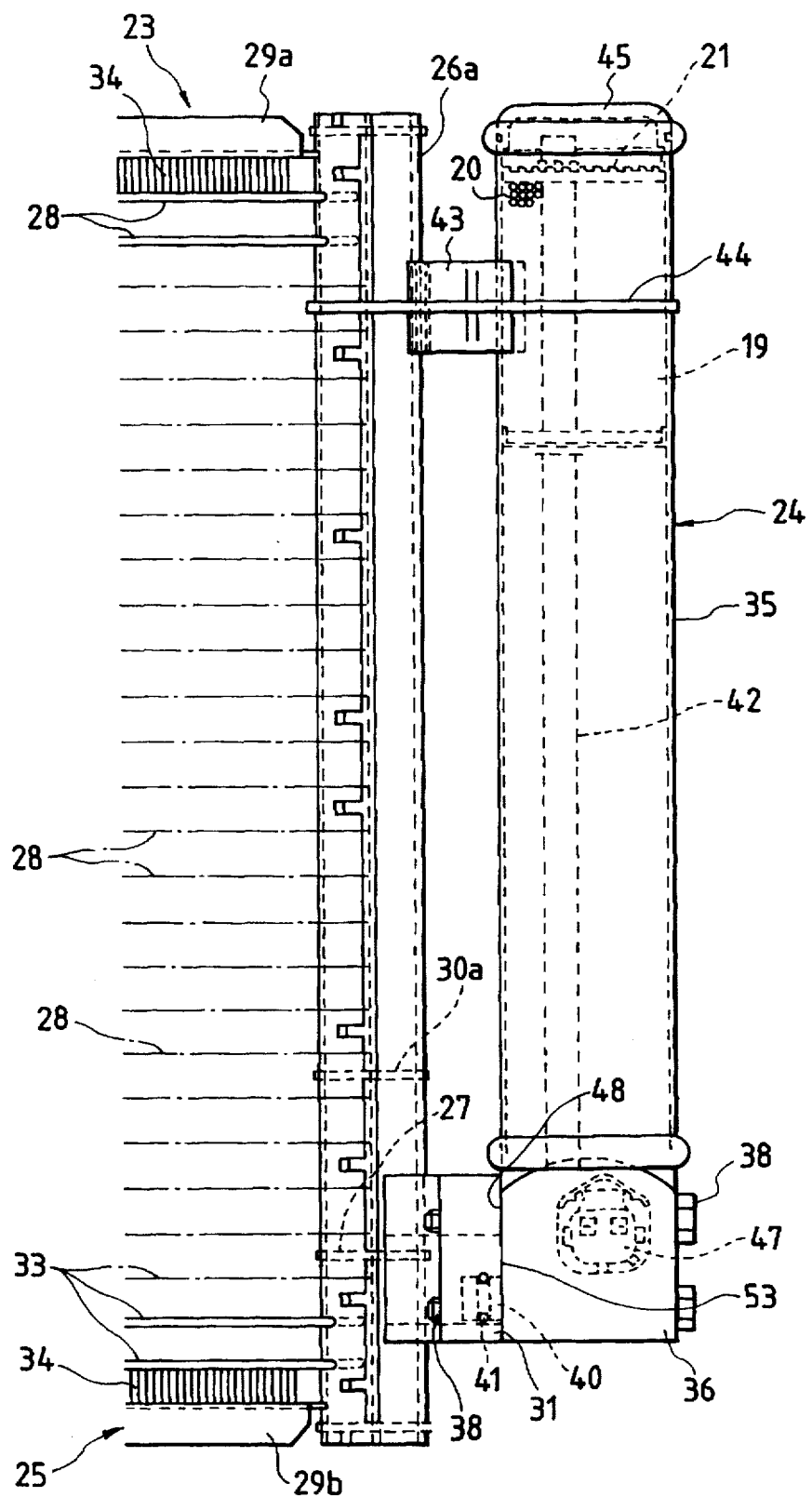
FIG. 3 shows a front view showing the right end portion of the condenser structure of FIG. 1 when it is assembled.

In the condenser 23, as shown in FIG. 3, a plural number of heat transferring pipes 28 are disposed between the inner surfaces of the header pipes 26a and 26b, respectively. In this case, both ends of the heat transferring pipes 28, respectively, pass through the inner walls of the header pipes 26a and 26b in air- and liquid-tight sealing manner. Those heat transferring pipes 28 are horizontally parallel but vertically spaced. Corrugated fins 34 are located between the adjacent heat transferring pipes 28. The corrugated fins 34 are also provided between the upper surface of the uppermost heat transferring pipe 28 and the lower surface of an upper side plate 29a, which is provided between the inner walls of the upper ends of the header pipes 26a and 26b. A couple of brackets 46a, spaced from each other, are fixed to the upper side of the upper side plate 29a. The brackets are used for mounting the condenser on a car body.

In the embodiment illustrated, within the header pipes 26a and 26b, partitioning walls 30a and 30b are provided within the mid portions of the header pipes 26a and 26b. A connection block 31 is hard soldered to the outer surface of the lower part of the right header pipe 26a (located on the right side in FIG. 2). An inlet block 32 is hard soldered to the outer surface of the upper part of the left header pipe 26b (located on the left side in FIG. 2). The connection block 31 includes a discharging port as an upper port located closer to the center of the right header pipe 26a, and a feeding port as a lower port closer to the lower end of the right header pipe 26a. The discharging port communicates with a part of the inside of the right header pipe 26a at a location above the partitioning wall 27. The feeding port communicates with the remaining part of the inside of the right header pipe 26a at a location below the partitioning wall 27. The inlet block 32 includes an inlet port, which communicates with a part of the inside of the left header pipe 26b at a location above the partitioning wall 30b. The refrigerant is fed into the condenser from the inlet port and flows through the heat transferring pipes between the header pipes 26a and 26b in the directions of arrows in FIG. 2, and reaches the discharging port. The inlet port corresponds to an opening at the upstream end of the condenser 23, and the discharging port, to an opening at the downstream end thereof. The feeding port corresponds to an opening of the upstream end of the subcondenser 25.

In the subcondenser 25, as shown in FIG. 3, one or a plural number of subheat-transferring pipes 33 (three pipes in the instant embodiment) are provided between the inner surfaces of the remaining parts (or the lower parts below the partitioning walls 27) of the header pipes 26a and 26b. In this case, both ends of the subheat-transferring pipes 33, respectively, pass through the inner walls of the header pipes 26a and 26b in keeping air- and liquid-tight sealing manner. Those subheat-transferring pipes 33 are horizontally parallel but vertically spaced. Corrugated fins 34, corresponding to the subfins, are located between the adjacent subheat-transferring pipes 33. The corrugated fins 34 are provided between the upper surface of the uppermost subheat-transferring pipe 33 and the lower surface of the lowermost heat transferring pipe 28 of those ones, and between the lower surface of the lowermost subheat-transferring pipe 33 and the upper surface of the lower side plate 29b, which is provided between the inner surfaces of the lower ends of the header pipes 26a and 26b. A couple of brackets 46b, spaced from each other, are fixed to the lower side of the lower side plate 29b. The brackets are used for mounting the condenser on a car body. An outlet block 37 with an outlet port is fixed to the outer surface of the lower part of the left header pipe 26b. The outlet port communicates with the remaining part (the lower part below the partitioning wall 27) of the left header pipe 26b, and corresponds to an opening of the downstream end of the subcondenser 25.

The liquid tank 24 includes a cylindrical case 35 and a mounting block 36. The top end of the case 35 is closed with an upper lid 45. The mounting block 36 is fixed to the lower end of the case 35. The mounting block 36 is detachably mounted on the connection block 31. Upper and lower threaded holes are bored in the flange of the connection block 31. Upper and lower through-holes are bored in the mounting block 36 at locations aligned with the threaded holes of the connection block 31. Bolts 38 are passed through the through-holes of mounting block 36 and screwed into the threaded holes of the connection block 31, to thereby firmly couple the mounting block 36 with the connection block 31. A pressure switch 47 is attached to the rear side of the mounting block 36 in order to detect a refrigerant pressure at the outlet of the condenser 23.

Figure 5:
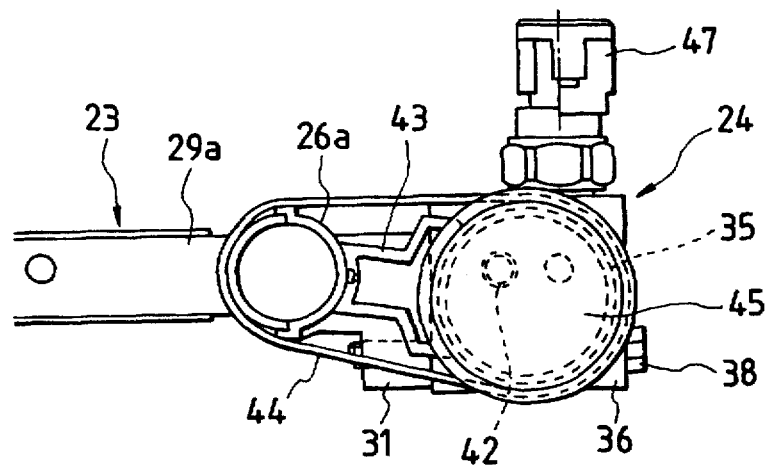
FIG. 5 shows a partial top plan view of the condenser structure as viewed from above in FIG. 3.

A flat connecting face 48 is formed on the inner side of the mounting block 36 (the side face of the mounting block opposite the header pipe 26a, or the left side face of the mounting block in FIGS. 2, 3 and 5). First and second L shaped refrigerant passages 51 and 52 are formed in the mounting block 36. Each of those passages 51 and 52 consists of a horizontal hole 49 and a vertical hole 50. The horizontal holes 49 of the first and second refrigerant passages 51 and 52 are terminated at the flat connecting face 48. Short pipes protruded outward from the openings of the horizontal holes 49 in the connecting face 48, respectively, form an take-in port 39 and a discharging port 40. The connection block 31 has a flat connected face 53. The flat connecting face 48 is to be brought into close contact with the connected face 53. The flat connecting face 48 is brought into close contact with the connected face 53, and the mounting block 36 is firmly coupled with the connection block 31 by means of coupling means. Here, the coupling means is formed with the threaded holes, the through-holes, and the bolts 38. In this state, the discharging port and the feeding port of the connection block 31 are air- and liquid-tightly coupled with the take-in port 39 and the discharging port 40, which are continuous to the horizontal holes 49 of the first and second refrigerant passages 51 and 52.

A take-in port 39 and a discharging port 40 are protruded from the upper and lower places of the side surface of the mounting block 36, respectively. In a state that the mounting block 36 is firmly coupled with the connection block 31 by means of the bolts 38, the take-in port 39 and the discharging port 40 are inserted into the discharging port and the feeding port of the connection block 31, respectively. The take-in port 39 of the mounting block 36 serves as a refrigerant inlet, and the discharging port of the connection block 31 serves as a refrigerant outlet. O rings 41 are applied to the outer surfaces of the take-in port 39 and the discharging port 40, in order to seal the connecting part between the take-in port 39 and the discharging port and that between the discharging port 40 and the feeding port. These O rings 41 are brought into contact with the inner surfaces of the discharging port and the feeding port, to thereby prevent the refrigerant from leaking through the connecting parts. When the liquid-tank/ subcondenser combined condenser structure is used for a long time and the liquid tank 24 must be repaired or replaced with another, only the liquid tank 24 may be detached from the condenser by unscrewing the bolts 38. When the liquid tank 24 is repaired or replaced, repairmen are released from that troublesome work to remove the condenser 23 from the car body.

The threaded holes, the through-holes and the bolts, which form the coupling means, may be provided in the central portions of the mounting block 36 and the subheat-transferring pipes 33 when viewed in the vertical direction.

In this case, only one set of the threaded holes, the through-holes and the bolts suffices for reliably coupling of the mounting block 36 with the connection block 31. The turn of the mounting block 36 and the connection block 31 may be prevented in a manner that a fitting-in coupling structure is used for either of the connecting part of the take-in port 39 and the discharging port or the connecting part of the discharging port and the take-in port. The reduction of the number of the component parts and the simplification of the assembling work brings about reduction of cost to manufacture. In an alternative, a flange is formed in the connection block 31, and a through-hole is formed in the flange. A flange is also formed on the mounting block 36, and a threaded hole is formed in the flange of the mounting block 36 at a position thereon corresponding to the position of the through-hole.

The take-in port 39 is communicatively connected to the lower end of the refrigerant transporting pipe 42. The upper end of the refrigerant transporting pipe 42 is opened into the upper portion in the case 35. The refrigerant is discharged from the discharging port at the downstream end of the condenser 23 into the take-in port 39, and transported by the refrigerant transporting pipe 42 to the upper portion of the case 35. As in the conventional structure shown in FIG. 19, a filter 19, a drying agent 20 and a porous holder plate 21 are stacked in the middle of the case 35, to thereby remove water content, foreign materials and the like from the refrigerant. The upper portion of the case 35 is firmly coupled with the upper portion of the right header pipe 26a with the aid of a spacer 43 and a holder belt 44. More specifically, the spacer 43 made of aluminum, synthetic resin or the like, is put between the outer surface of the upper portion of the right header pipe 26a and the inner surface of the upper portion of the case 35, and the upper portions of the right header pipe 26a and the case 35 are coupled together by means of the holder belt 44.

Figure 18:
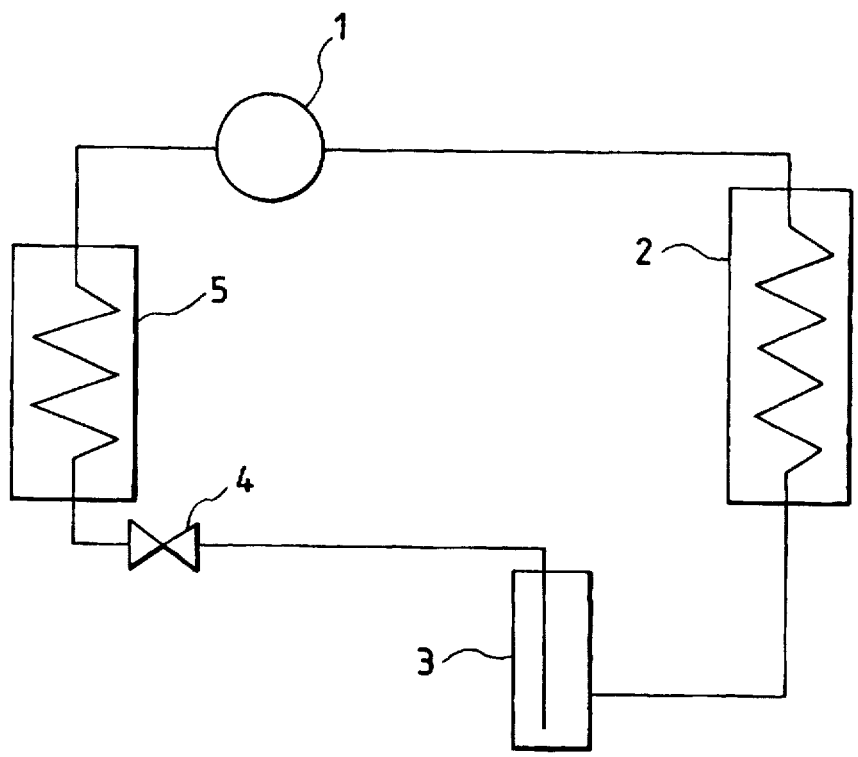
FIG. 18 shows a circuit diagram showing a basic construction of a refrigerator of the vapor compressing type.

To assemble the thus constructed liquid-tank/ subcondenser combined condenser structure of the present invention into a vapor compressing type refrigerator, the downstream end of the refrigerant pipe connecting to the compressor 1 (FIG. 18) is connected to the inlet port of the inlet block 32, and the upstream end of the refrigerant pipe connecting to the evaporator 5 (FIG. 18) is connected to the outlet port of the outlet block 37. In this state, the compressor 1 is operated. Then, the liquid-tank/subcondenser combined condenser structure condenses the refrigerant received from the compressor 1 to supercool the refrigerant, and feeds the supercooled refrigerant to the evaporator 5.

The refrigerant gas is fed from the inlet port of the inlet block 32 to the condenser 23, and the refrigerant gas flows between the header pipes 26a and 26b, through the heat transferring pipes 28 of the condenser 23. During the flowing of the refrigerant gas, the desired heat exchange is carried out between the refrigerant gas and air which flows along the heat transferring pipes 28 and through the spaces of the corrugated fins 34. The refrigerant gas is condensed and liquidized. The resultant liquid refrigerant is sent from the discharging port of the connection block 31 to the take-in port 39 of the mounting block 36 forming the liquid tank 24. The liquid refrigerant, which reaches the take-in port 39, is then sent through the refrigerant transporting pipe 42 to the upper portion of the case 35, and flows down within the case 35. The liquid refrigerant, when flowing down, passes through the filter 19 and the drying agent 20, so that the water content, foreign matters, and the like are removed from the liquid refrigerant. Then, the refrigerant is sent through the discharging port 40 to the feeding port of the connection block 31. The liquid refrigerant, which reaches the feeding port, flows through the subheat-transferring pipes 33 of the subcondenser 25. When the refrigerant flows through the subheat-transferring pipes, it is supercooled. The liquid refrigerant thus supercooled is sent to the evaporator 5, through the outlet port of the outlet block 37.

When the liquid tank 24 must be repaired or replaced with a new one, the holder belt 44 is removed and the bolts 38 are unscrewed. The mounting block 36 mounted on the lower end of the liquid tank 24 is detached from the connection block 31 fastened to the side wall of the lower portion of the right header pipe 26a. Accordingly, only the liquid tank 24 can be repaired while the condenser 23 and the subcondenser 25 are left attached to the car body.

Figure 4:
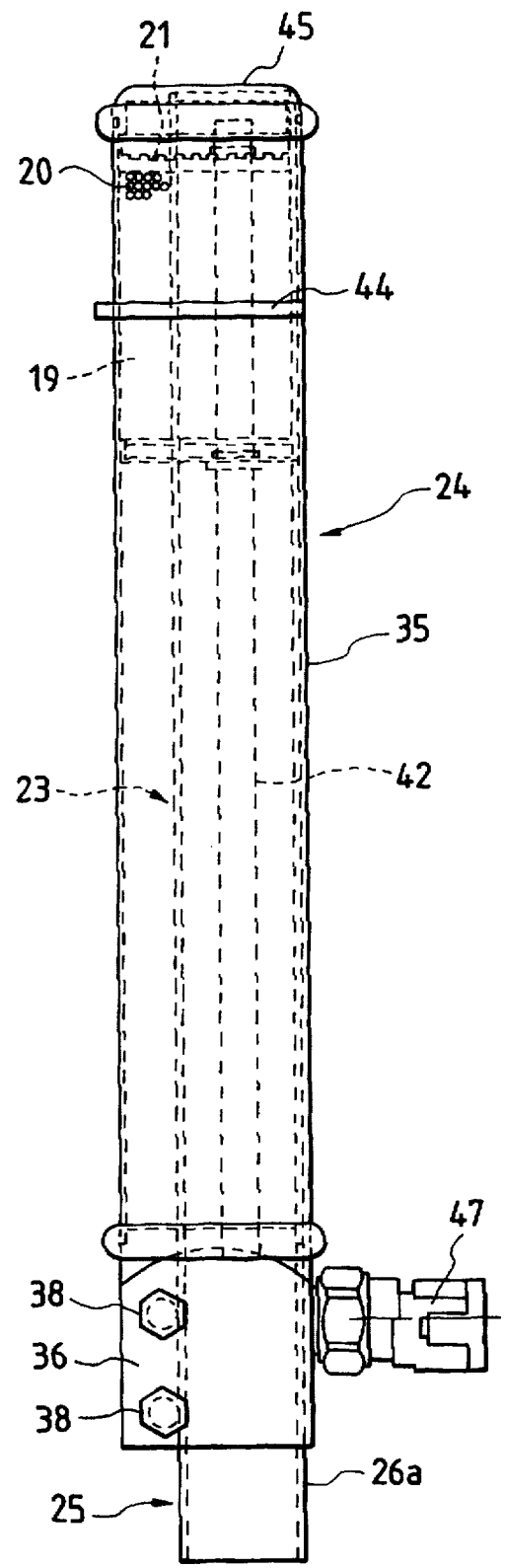
FIG. 4 shows a side view of the condenser structure as viewed from the right side in FIG. 3.

In the illustrated embodiment, the liquid tank 24 is slightly displaced to the front from the right header pipe 26a (the word "front" means the front of a car when viewed in the advancing direction of the car, and in FIGS. 2 and 3, it is this side, in FIG. 4, it is the left side, and in FIG. 5, it is the lower side). Accordingly, the rear part of the liquid tank 24 is not protruded backward beyond the rear sides of the condenser 23 and the subcondenser 25. The condenser 23 and the subcondenser 25, which form the vapor compressing type refrigerator for a car air conditioner, is frequently located in immediate proximity to the front of a radiator for radiating heat from the cooling water. If the rear part of the liquid tank 24 is protruded backward beyond the rear sides of the condenser 23 and the subcondenser 25, it is difficult to place the liquid-tank/subcondenser combined condenser structure in immediate proximity to the front of the radiator. However, in the illustrated embodiment, the rear part of the liquid tank 24 is not protruded backward beyond the rear sides of the condenser 23 and the subcondenser 25, and then it is easy to place the liquid-tank/subcondenser combined condenser structure in immediate proximity to the front of the radiator. In other words, the invention provides easy design of automobiles.

In the illustrated embodiment, the mounting block 36 partly forming the liquid tank 24 is located on the lower side of the case 35 in order that the liquid tank 24 is located by the side of the header pipe 26a in the same level as of the header pipe. If required, the mounting block 36 may be located on the upper side of the case 35. In this case, the take-in port 39 is interchanged with the discharging port 40, and the refrigerant transporting pipe 42 is communicatively connected to the discharging port 40. The components for air conditioners, such as a pressure switch, a charger valve, and a solderable plug, are placed in a space formed anew by the side of the right header pipe 26a. Also in this case, the take-in port 39 and the discharging port 40 may be designed to have the same shape and size, and the connection block 31 and the mounting block 36 may be designed to be symmetrical vertically and horizontally. If so designed, the liquid tank 24 may be used in a state that it is turned upside down.

2nd Embodiment

Figure 6:
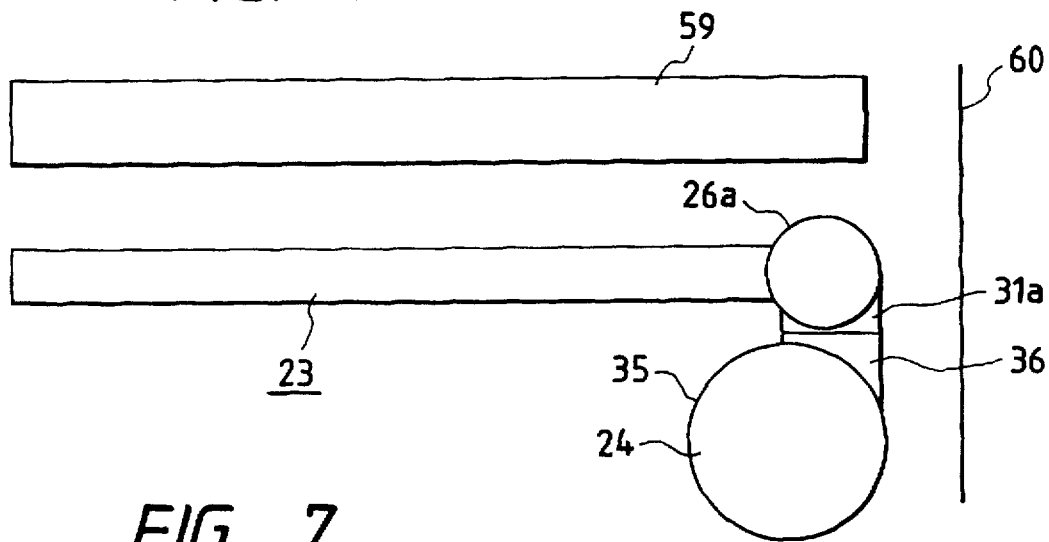
FIG. 6 shows a top plan view of the condenser structure of a second embodiment of the present invention.

FIG. 6 shows a second embodiment of the present invention. In the present embodiment, a case 35 forming a liquid tank 24 is fixedly disposed in a state that it is displaced to the front with respect to the header pipe 26a forming the condenser 23, more exactly the center axis of the case 35 is displaced to the front (lower side in FIG. 6) with respect to that of the header pipe 26a. Accordingly, the case 35 little interferes with the radiator 59, and further the case 35 is not protruded to the side of the condenser 23. In case where the header pipe 26a is placed in close proximity to a side panel 60 of the car body, the embodiment having such a structure can prevent the liquid tank 24 from interfering with the side panel 60. Accordingly, the condenser structure of the embodiment is useful when it is installed in the engine room of the small width dimension. For the engine room of the fixed width dimension, the width dimension of the core of the condenser 23 to be installed in the engine room may be increased. The liquid tank constructed as of the first embodiment may be used for the liquid tank of the second embodiment. Specifically, the same liquid tank as of the first embodiment may be used for the liquid tank of the second embodiment by merely modifying the shape of the connection block 31a fastened to the header pipe 26a.

Figure 19:
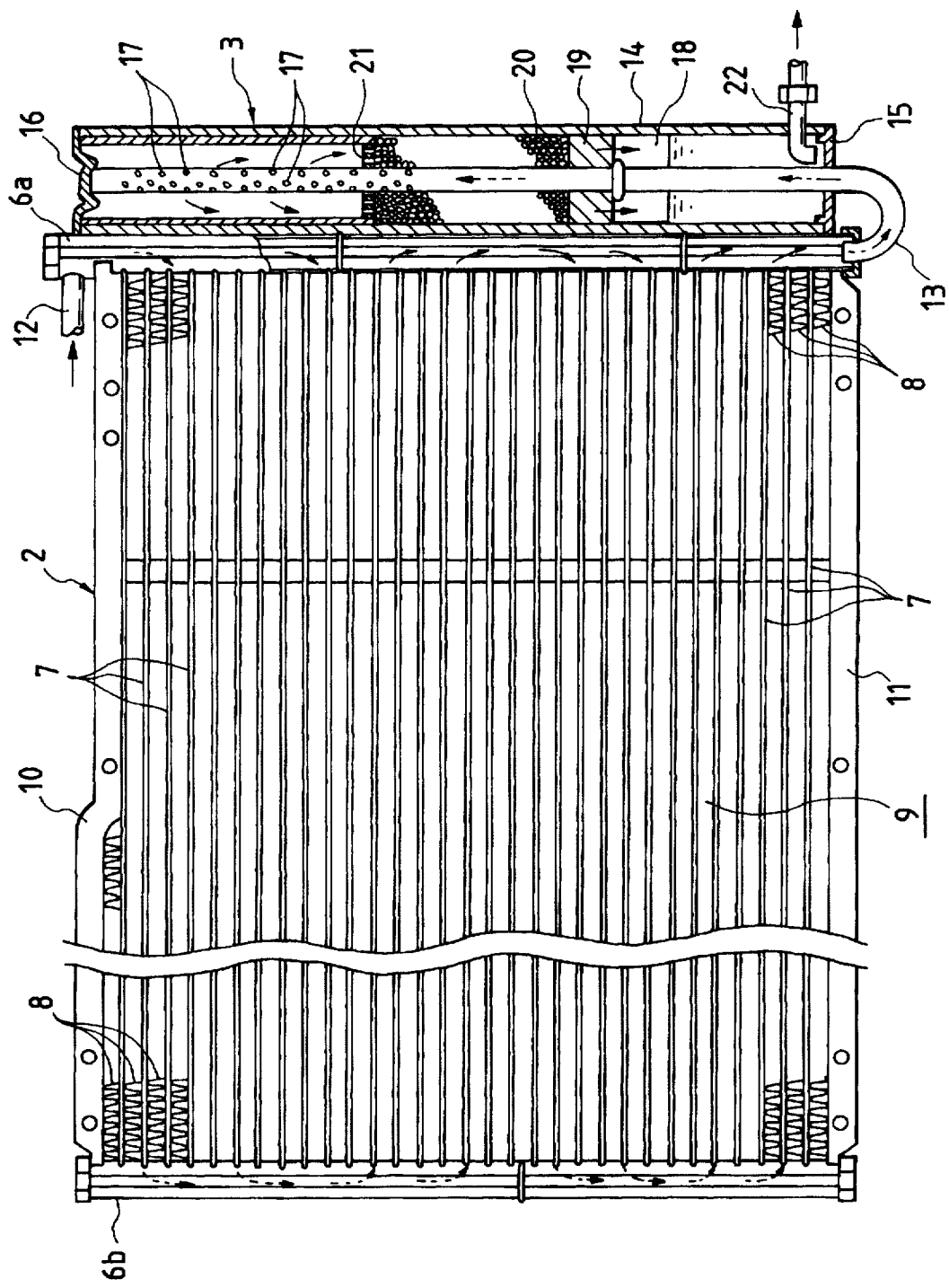
FIG. 19 shows a front view, partly in cross section, showing a conventional condenser with a liquid tank.

The useful effects, which result from the structural feature that the liquid tank 24 is displaced to the front with respect to the header pipe 26a, are obtained also in the condenser structure in which the liquid tank 24 is not detachable (i.e., the condenser structure of the fixed type as shown in FIG. 19). The same effects are also obtained in the condenser structure not having the subcondenser (also as shown in FIG. 19). Thus, the present invention is applicable to the condenser structures of the fixed type and not having the subcondenser.

3rd Embodiment

Figure 7:
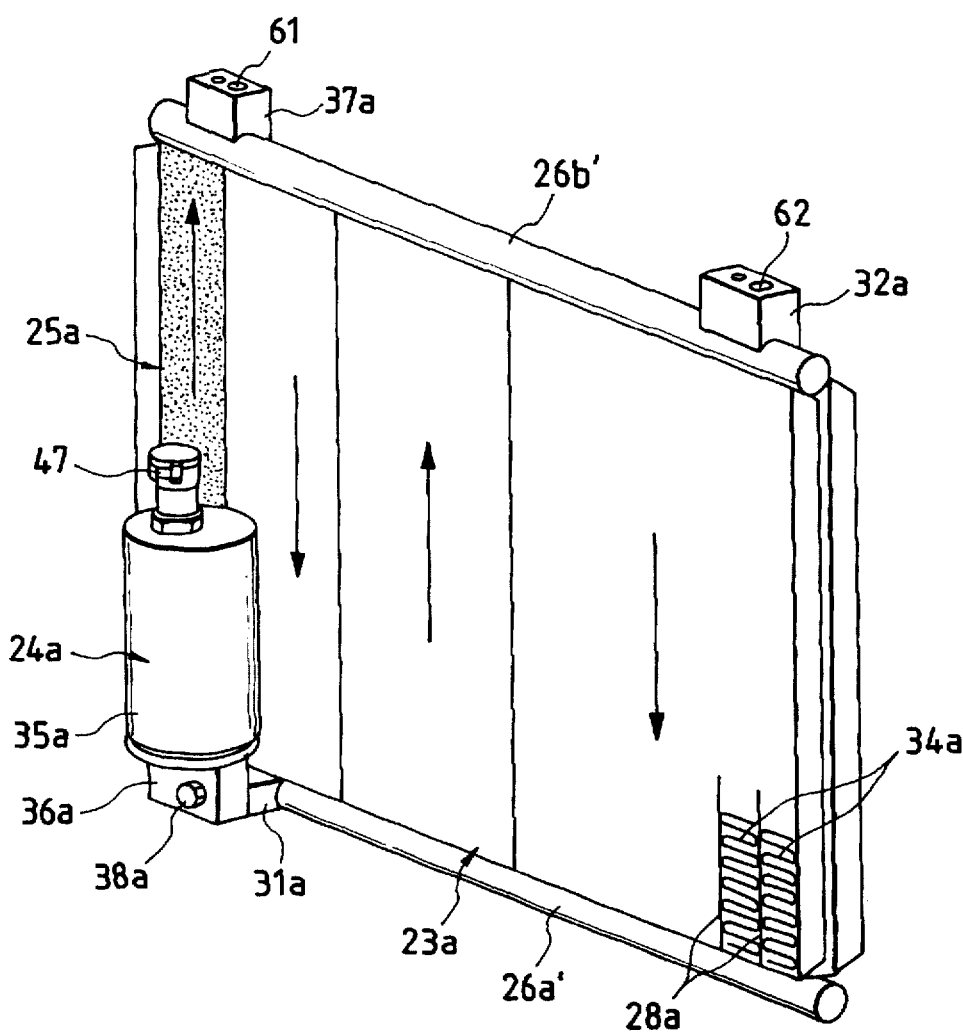
FIG. 7 shows a perspective view showing a liquid-tank/ subcondenser combined condenser structure according to a third embodiment of the present invention.

FIG. 7 shows a third embodiment of the present invention. In the embodiment, the invention is applied to a liquid-tank/subcondenser combined condenser structure. The condenser and the subcondenser are both of the called vertical flow type in which refrigerant vertically flows between a couple of header pipes. In the liquid-tank/subcondenser combined condenser structure, as shown in FIG. 7, a condenser 23a and a subcondenser 25a are constructed including a couple of header pipes 26a' and 26b' vertically spaced. The inner spaces of the portions of the header pipes 26a' and 26b', which are close to the first ends (left ends in FIG. 7) thereof, are air- and liquid-tightly partitioned by partitioning walls (not shown). Portions of the header pipes 26a' and 26b', which are closer to the second ends (right ends in FIG. 7) of the header pipes than to the partitioning walls of the header pipes, form the condenser 23a. The remaining portions of the header pipes 26a' and 26b', which are closer to the first ends of the header pipes than to the partitioning walls of the header pipes, form the subcondenser 25a. Heat transferring pipes 28a and subheat-transferring pipes (not shown), which form the condenser 23a and the subcondenser 25a, are horizontally extended and vertically spaced between the header pipes 26a' and 26b', in a state that fins 34a are placed between the adjacent heat transferring pipes 28a and between the adjacent subheat-transferring pipes.

A connection block 31a is hard soldered to the front side of a first end of the lower header pipe 26a' (located in the lower portion in FIG. 7). An inlet block 32a is also hard soldered to the upper side of a second end of the upper header pipe 26b' (located in the upper portion in FIG. 7). The connection block 31a includes a discharging port at a location closer to the center of the lower header pipe 26a' (closer to the right side in FIG. 7), and a feeding port located to the end thereof (closer to the left side in FIG. 7). The discharging port communicates with the inside of a part of the lower header pipe 26a' at a location closer to the center of the lower header pipe 26a' than the partitioning wall therein. The feeding port communicates with the inside of the remaining part of the lower header pipe 26a' at a location closer to the end of the lower header pipe 26a' than the partitioning wall. The inlet block 32a has an inlet port 62, which communicates with the inside of the second end of the header pipe 26b'. Refrigerant, which comes in through the inlet port 62, flows through the heat transferring pipes 28a in a zig-zag fashion as shown between the couple of the header pipes 26a' and 26b', and reaches the discharging port of the connection block. In the embodiment, the inlet port 62 corresponds to an opening at the upstream end of the condenser 23a, and the discharging port, to an opening of the downstream end thereof. The feeding port corresponds to an opening at the upstream end of the subcondenser 25a.

A mounting block 36a is firmly attached to the lower end of a case 35a forming a liquid tank 24a, which is connected in series between the condenser 23a and the subcondenser 25a when viewed in the direction of the refrigerant flow. The mounting block 36a is detachable from the connection block 31a. Specifically, the mounting block 36a is fastened to the connection block 31a by screwing a bolt 38a into a threaded hole, which is formed at a location closer to the center of the mounting block 36a and between the discharging port and the feeding port of the same. The discharging port and the feeding port of the connection block 31a are horizontally aligned, and a take-in port and a discharging port (not shown) of the same are also horizontally aligned.

An outlet block 37a with an outlet port 61 is fastened to the upper side of the first end of the upper header pipe 26b'. The outlet port 61 communicates with the inside of the first end of the upper header pipe 26b'. After passing through the liquid tank 24a, the refrigerant flows from the lower header pipe 26a' to the upper header pipe 26b', and reaches the inside of the first end of the upper header pipe 26b'. The refrigerant is discharged from the outlet port 61, and sent to the evaporator 5 (see FIG. 18), by way of the expansion valve 4. As described above, the present invention may be applied to such a construction that the header pipes 26a' and 26b' are disposed vertically spaced from each other, and the refrigerant is made to flow between those header pipes in the vertical direction.

4th Embodiment

As in a fourth embodiment shown in FIGS. 8(A) and 8(B), the flange may be removed from the mounting block 36, and a threaded hole 56 may be formed in the body of the mounting block 36. In this case, the threaded hole 56 is formed at a location between the horizontal holes 49. With this structure, the mounting block 36 can reliably be coupled with the connection block 31 firmly attached to the header pipe 26a, by a single bolt. In the structure, the threaded hole 56, the through-hole formed in the connection block 31 and the single bolt form a coupling means. When the structure shown in FIGS. 8(A) and 8(B) is disposed by the side of the header pipe 26a, which forms the condenser 23 having the structure as shown in the first embodiment, and fastened thereto, the connection block 31 is coupled with the mounting block 36 before the connection block 31 is fastened to the outer surface of the header pipe 26a.

5th Embodiment

Figure 9:
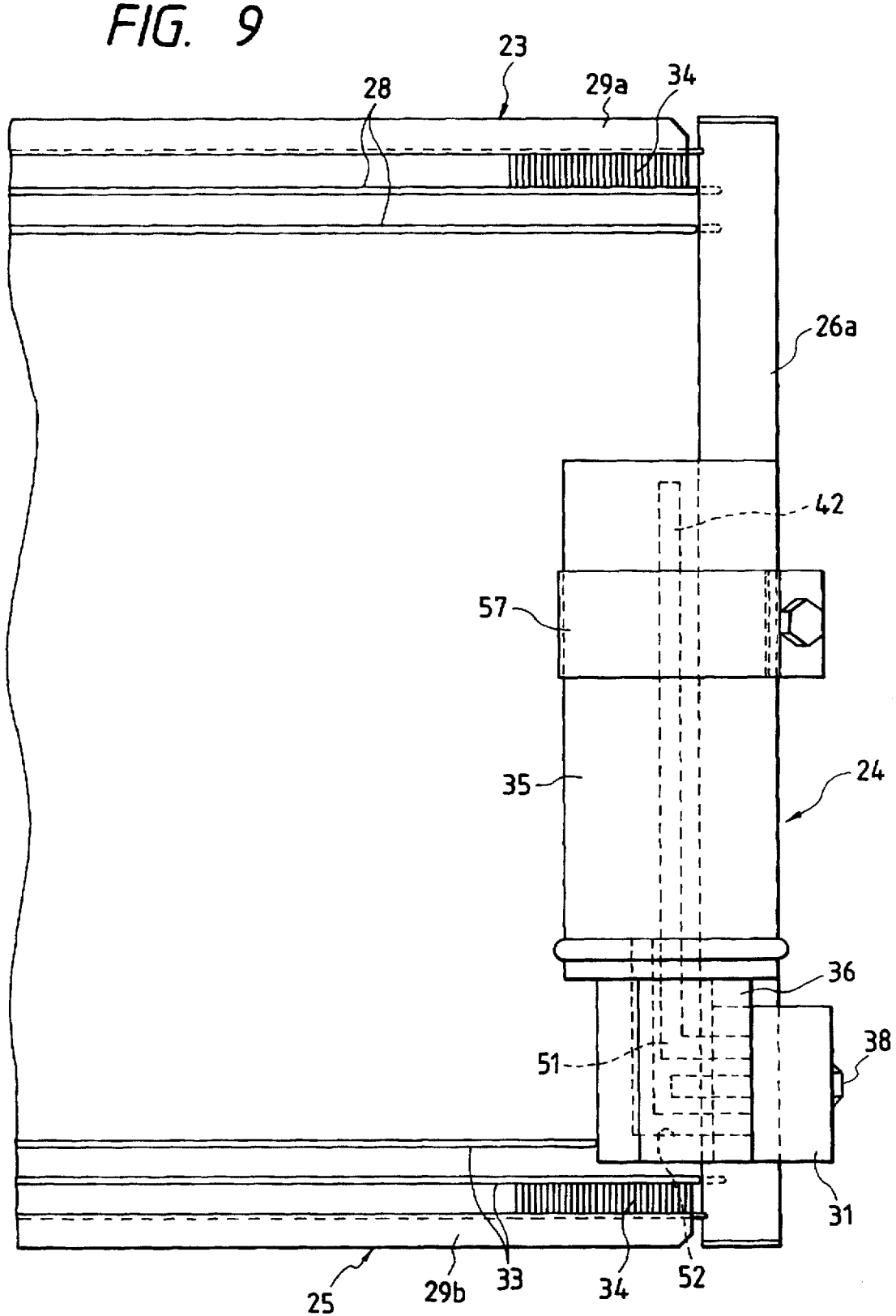
FIG. 9 shows a partial front view of a fifth embodiment of the present invention.
Figure 10:
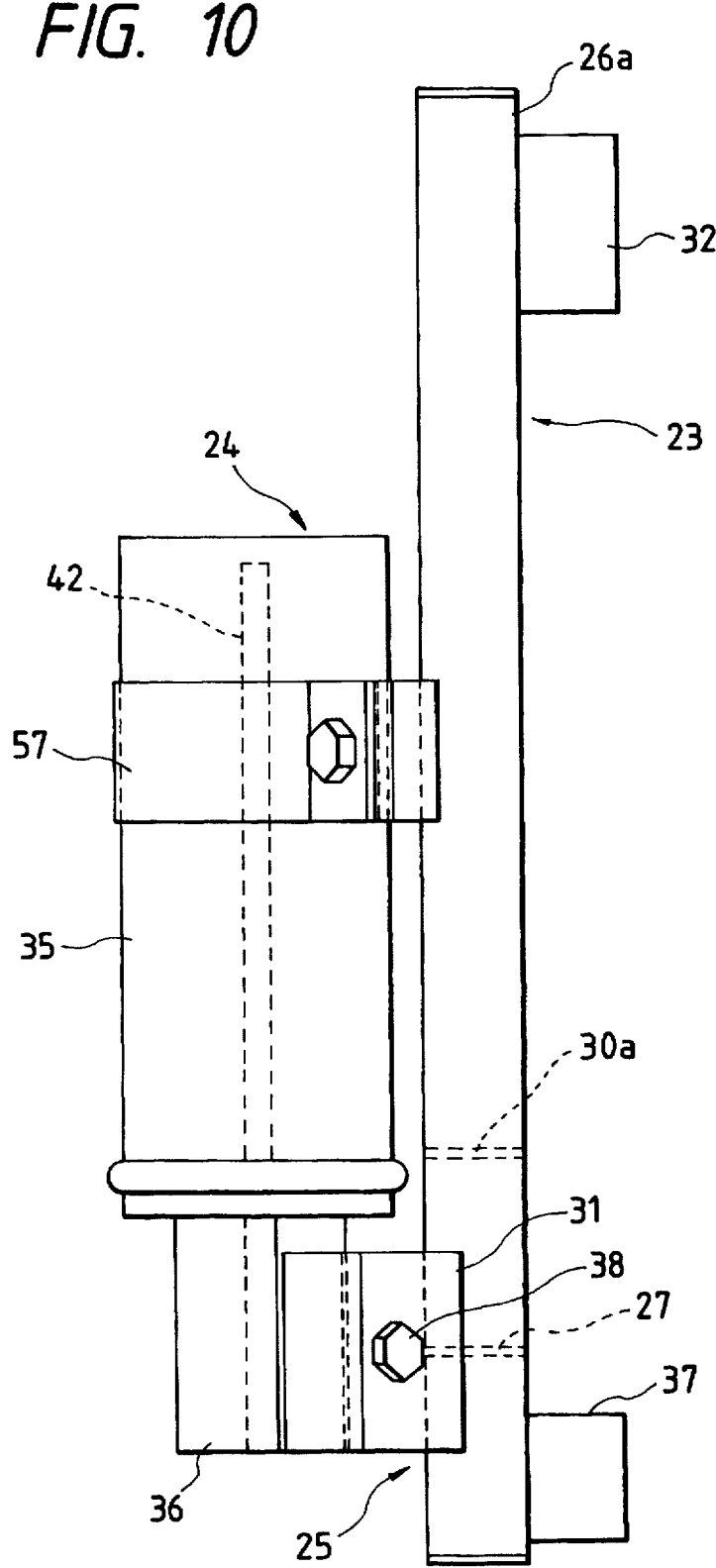
FIG. 10 shows a side view as viewed from the right side of FIG. 9.
Figure 11:
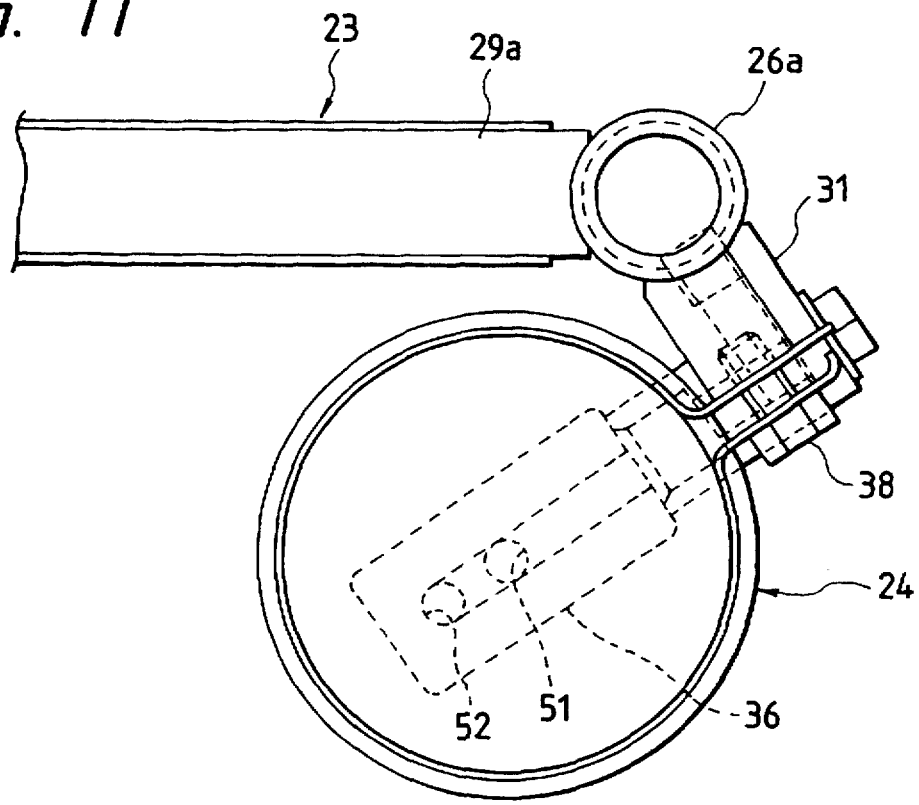
FIG. 11 shows a partial enlarged top view as viewed from above of FIG. 9.

A fifth embodiment of the invention is shown in FIGS. 9 to 11. In the structure of the fifth embodiment, the structure as shown in FIGS. 8(A) and 8(B) may be used, and the coupling work of the connection block 31 and the mounting block 36 may be performed after the assembling work of the condenser 23. Further, it is easy to separate the liquid tank 24 from the condenser 23. In the structure shown in FIGS. 9 to 11, a couple of refrigerant passages (not shown), shaped like L when viewed from above, are formed in the connection block 31 while being vertically spaced from each other. That is, the upper and lower refrigerant passages are formed in the connection block. The upper refrigerant passage communicates with the first refrigerant passage 51 of the mounting block 36, while the lower refrigerant passage, with the second refrigerant passage 52. To couple the connection block 31 with the mounting block 36, the single bolt 38 is inserted into a through-hole, which is formed between the upper and lower refrigerant passages in the connection block 31, and tightly screwed into the threaded hole 56 (FIGS. 8(A) and 8(B)), which is formed between the first and second refrigerant passages 51 and 52. In the structure under discussion, the through-hole, the threaded hole 56 and the single bolt 38 form coupling means. In the fifth embodiment, the liquid tank 24 can be removed from the condenser 23 by operating only one bolt 38. In this respect, the fifth embodiment provides an easy detaching operation of the liquid tank.

Incidentally, the middle of the header pipe 26a and the upper portion of the case 35 are coupled together with a clamping jig 57.

6th Embodiment

Figure 12:
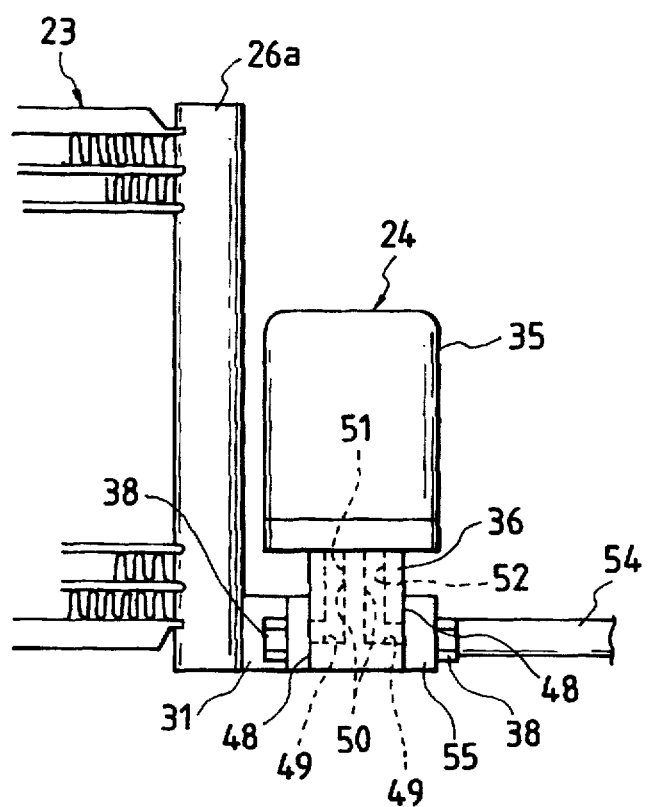
FIG. 12 shows a partial front view of a sixth embodiment of the present invention.
Figure 13:
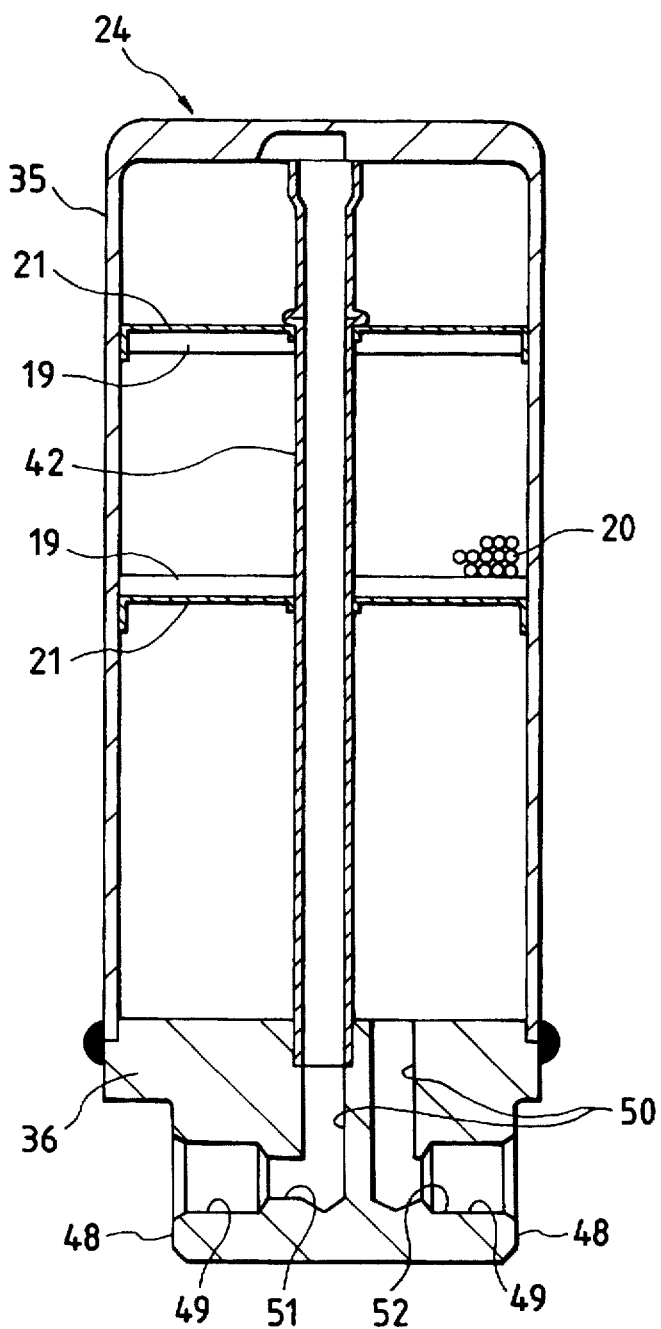
FIG. 13 shows a side view of a liquid tank used in the sixth embodiment.

FIGS. 12 and 13 show a condenser structure according to a sixth embodiment of the present invention. In the aforementioned embodiments, the liquid tank 24 is combined with the condenser 23 integral with the subcondenser 25 in a manner that the liquid tank 24 is connected in series to the condenser 23 and the subcondenser 25. In a condenser structure of the sixth embodiment, the subcondenser 25 is omitted. In this structure, when refrigerant is fed from the header pipe 26a forming the condenser 23 to the liquid tank 24, the refrigerant is directly discharged into a refrigerant pipe 54 that connects to an expansion valve 4, not returning to the header pipe 26a. Therefore, in the condenser structure of the sixth embodiment, there is no need of using an outlet block as attached to the left header pipe 26b.

In the present embodiment, a couple of parallel connecting faces 48 are formed on the mounting block 36 that is provided at the lower end of the liquid tank 24. Horizontal holes 49, which respectively form the first and second refrigerant passages 51 and 52, are formed in the mounting block 36 in a state that these holes, oppositely directed, are aligned with each other and respectively terminated and opened at the connecting face 48. The opening of the horizontal hole 49 forming the first refrigerant passage 51 is communicatively connected to the discharging port of the connection block 31 fixed to the outer surface of the lower portion of the header pipe 26a. The connection block 31 and the mounting block 36 are firmly coupled together by means of a bolt 38, which is passed through the flange of the connection block 31. One side face (right side face in FIG. 12) of the flange serves as a connected face. In the present embodiment, coupling means is formed with the through-hole formed in the flange, the threaded hole formed in the mounting block 36, and the bolt 38, which is passed through the through-hole and screwed into the threaded hole. The opening of the horizontal hole 49 forming the second refrigerant passage 52 is communicatively connected to the opening at the upstream of the refrigerant pipe 54. A connector 55 fixed to the upstream end of the refrigerant pipe 54 is coupled together with the mounting block 36 by means of another bolt 38 that is passed through the connector 55.

In the embodiment not using the subcondenser 25, if the required supercooling of the refrigerant exceeds the supercooling obtained by the condenser 23, a subcondenser is additionally provided in the higher part of the refrigerant flow. The remaining construction and the operation of the sixth embodiment are substantially the same as those of the embodiments already mentioned. The direction of the horizontal hole 49 which forms the second refrigerant passage 52 connecting to the upstream end of the refrigerant pipe 54, is not limited to the illustrated one, but may be another suitable direction. In case where the side panel, for example, is located by the side of the condenser 23, the horizontal holes 49 are formed in the portion of the mounting block 36, which is located close to the front side (this side in FIGS. 12 and 13) of the mounting block 36. The refrigerant pipe 54 may be removed to this side with respect to the condenser with the liquid tank. This structure enables the condenser with the liquid tank to be installed in the space with a limited width. The fifth embodiment may also be applied to the condenser structure not having the subcondenser. In this case, of the upper and lower refrigerant passages formed in the connection block 31, the lower refrigerant passage is communicatively connected to the end of the refrigerant pipe, not connected to the header pipe 26a.

In any of the embodiments described above, the liquid tank 24, 24a is secured to the header pipe 26a, 26a' of the condenser 23, 23' in a state that the mounting block 36, 36a partly forming the liquid tank 24, 24' are located on the under side of the case 35, 35a. The liquid tank 24, 24' may be mounted while being turned upside down in the present invention. Specifically, the mounting block 36, 26a is placed at the opening at the upper end of the case 35, 35a. In this state the liquid tank 24, 24' is fastened to the header pipe 26a, 26a' of the condenser 23, 23a. If fastened so, a space is formed at a location by the side of the header pipe 26a, 26a' and above the liquid tank 24, 24'. Attachments for air conditioners, such as a pressure switch, a charger valve, and a soldarable plug, may be placed in the space formed anew. If so done, effective use of the space is realized. The faces, opposed to each other, of the connection block 31, 31a and the mounting block 36, 36a (these faces are the flat connecting face 48 and the connected face 53) are vertically and horizontally symmetrical in shape. Further, the structure of the coupling means is also symmetrical vertically and horizontally. If those faces and the structure are so designed, one liquid tank may be set directed either upward or downward. In the case Of the fourth embodiment of FIGS. 8(A) and 8(B), for example, the direction of the liquid tank 24, i.e., the upward or downward direction, may be selected as desired when the ink tank is set.

7th Embodiment

Figure 14:
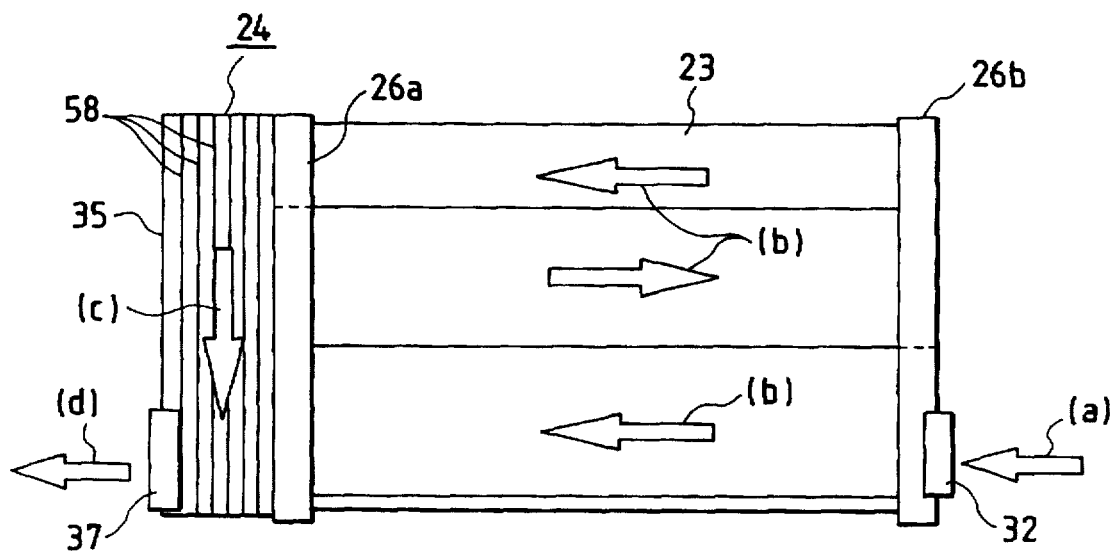
FIG. 14 shows a front view of a condenser structure of a seventh embodiment of the present invention.
Figure 15:
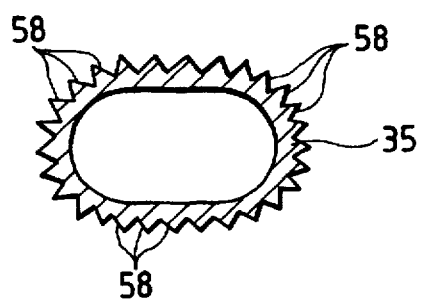
FIG. 15 shows a sectional view of a liquid case used in the seventh embodiment.

FIGS. 14 and 15 show a condenser structure with a liquid tank according to a seventh embodiment of the present invention. In the embodiment, the outer surface (the left side surface in FIG. 14) of the header pipe 26a (located on the left side in FIG. 14) of those pipes 26a and 26b is firmly coupled with the inner side surface (the right side surface in FIG. 14) of a case 35 that defines a liquid tank 24. A suitable coupling method by hard soldering, using the bracket, or the like may be used for the coupling of them. The case 35 is formed in one piece construction by extrusion molding aluminum alloy. The formed case is shaped in cross section as shown in FIG. 15 and a plural number of radiating fins 58 are formed on the outer surface of the case 35. The radiating fins 58 on the outer surface portions, which are to be used for the connection to the left header pipe 26a and for the formation of an outlet block 37, are removed therefrom in advance (or the fins are formed on the outer surface of the case 35 except those portions). The outlet block 37 is formed in the outer surface (the left side surface in FIG. 14) of the lower portion of the case 35. The inlet block 32 is formed in the outer surface (the right side surface in FIG. 14) of the lower portion of the right header pipe 26b (located on the right side in FIG. 14).

A number of the radiating fins 58 are formed on the outer surface of the case 35, which defines the liquid tank 24 of the condenser structure. Air around the liquid tank is always cooled with the radiating fins 58. With the radiating fins 58, the liquid refrigerant is supercooled when it flows down in the direction of the arrow (c) within the case 35, and the supercooled liquid refrigerant stands in the bottom part of the liquid tank 24. Thus, the liquid refrigerant that is supercooled and stays in the bottom part of the liquid tank 24 is discharged into a refrigerant pipe (not shown) and sent to the evaporator 5 by way of the refrigerant pipe (The refrigerant flow direction is indicated by an arrow (d)). In the condenser structure of this embodiment, the heat exchange between the refrigerant and air is carried out in the liquid tank 24. In other words, the supercooling of the refrigerant to be fed to the evaporator 5 is performed by the liquid tank 24 without the subcondenser. This contributes to cost reduction. In the hard soldering for firmly coupling the liquid tank 24 with another member, temperature rise of the liquid tank 24 is rapid, to thereby reduce a temperature difference between the liquid tank 24a and another member to a negligible value in practical use. Accordingly, when the left header pipe 26a is hard soldered to the case 35, good soldering is secured, so that a production yield is improved. Also in case where the bracket is used for coupling the left header pipe 24 with the case 35, good hard soldering is secured in coupling the component parts of the liquid tank 24.

8th Embodiment

Figure 16:
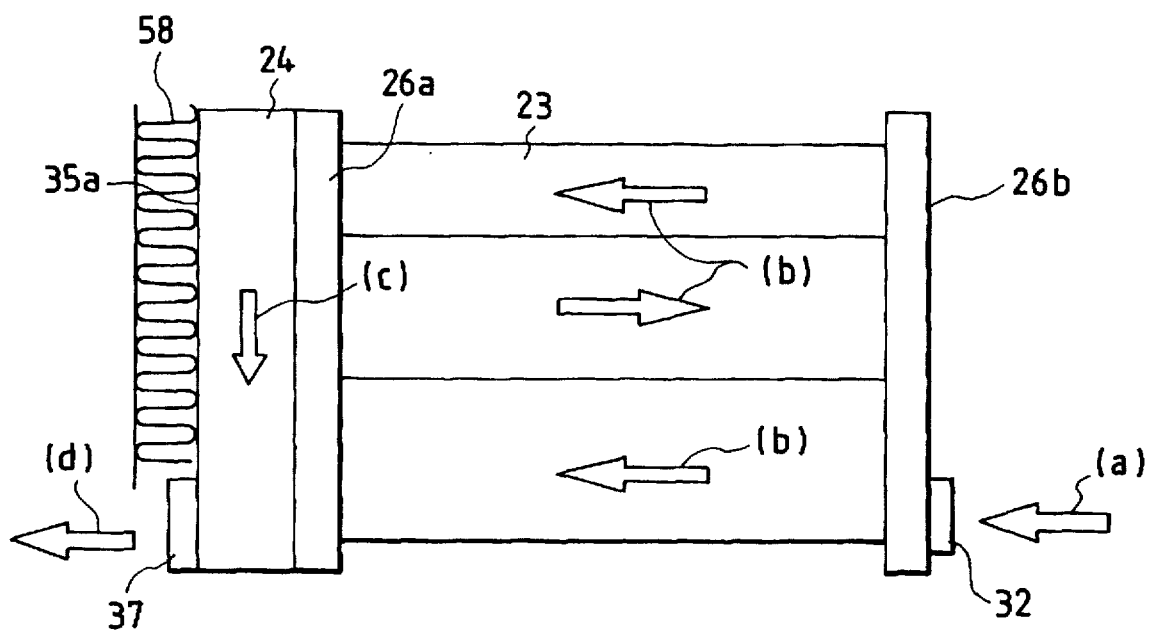
FIG. 16 shows a front view of a condenser structure of an eighth embodiment of the present invention.

FIG. 16 shows an eighth embodiment of the present invention. A case 35a that forms the liquid tank 24 is shaped simply cylindrical. Radiating fins 58 of the corrugated type are hard soldered to the outer surface of the case 35a. In operation, the radiating fins 58 functions to lower temperature of the case 35a, and the liquid refrigerant flowing down within the case 35a is supercooled.

9th Embodiment

Figure 17:
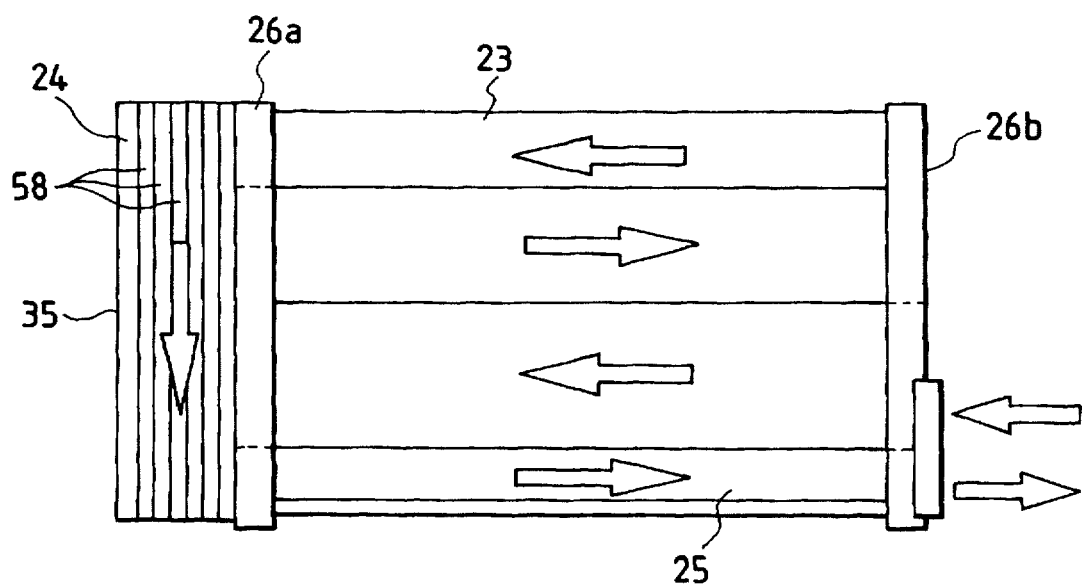
FIG. 17 shows a front view of a condenser structure of a ninth embodiment of the present invention.

FIG. 17 shows a ninth embodiment of the present invention. In the embodiment, the present invention is applied to the condenser structure in which the subcondenser 25 is provided on the underside of the condenser 23. A liquid tank 24 with the case 35, like that assembled into the seventh embodiment, is provided on the outer surface (the left side surface in FIG. 17) of the left header pipe 26a. The refrigerant is condensed and liquidized by the condenser 23, and primarily cooled when it passes through the liquid tank 24a, and the cooled liquid refrigerant is fed to the subcondenser 25. In the present embodiment, the condenser 23 and the subcondenser 25 that are used may be smaller in size than those in the conventional condenser structure in order to secure a necessary supercooling.

In the seventh to eighth embodiments, there are provided radiating fins 58 with the case 35, 35a. However, the radiating fins 58 can be formed on the case 35, 35a of the first to sixth embodiments.

The condenser structure with a liquid tank according to the present invention, which is constructed and operated as described above, has the following advantages.

The condenser and the liquid tank can be handled in the form of a unit, as of the conventional art. Accordingly, the condenser structure may easily be installed in a limited space of the engine room. There is eliminated such a troublesome work that the vibration-proof measure must be taken for each of the condenser and the liquid tank. This makes it easy to install the condenser structure with a liquid tank.

When the liquid tank is abnormal, only the liquid tank can be detached for repair or replacement with another, while the remaining structure being attached to the car body. Accordingly, time for the repairs and cost reduction are reduced.

Further, the rear part of the tank is not produced rearword from the rear side of the condenser. Accordingly, the condenser may easily be placed in immediate proximity to the radiater. In other words, the present invention provides an easy design of automobiles.

Furthermore, a satisfactory supercooling of the refrigerant to be fed to the evaporator can be secured even if the condenser and the subcondenser that are used are small. If required, the subcondenser may be omitted. The improved hard soldering improves the production yield and the productivity, to thereby provide a further cost reduction.

What is claimed is:

1. A condenser structure with a liquid tank comprising:
   (1) a condenser including:
       a pair of header pipes spaced from each other;
       a plural number of heat transferring pipes disposed between said pair of header pipes so as to be spaced from each other, both ends of said heat transferring pipes being opened to an inside of said header pipes; and
       fins disposed between said adjacent heat transferring pipes spaced from each other; and
   (2) a liquid tank fastened to said first header pipe so as to receive a liquid refrigerant discharged from a discharging port of said condenser;
       wherein means are provided for coupling said first header pipe and liquid tank with each other detachably in such a manner that a liquid refrigerant flowing passage is formed so as to be air- and liquid-tight.

2. The condenser structure with a liquid tank according to claim 1, wherein said condenser further includes:
    a connection block fastened to an outer surface of a first end of said first header pipe and having a first discharging port and a feeding port in which said liquid refrigerent flows; and
    said liquid tank includes: a case, whose first end is closed and a second end is opened; and a mounting block fastened to said second end of said case and having a take-in port and a second discharging port;
    wherein said first discharging port and take-in port are coupled and said second discharging port and feeding port are coupled air- and liquid-tightly.

3. The condenser structure with a liquid tank according to claim 2, wherein said mounting block has a connecting face thereon, said take-in port and second discharging port are opened at said connecting face; and said connection block has a connected face thereon, said first discharging port and feeding port are opened at said connected face; wherein said connecting face and connected face are coupled with each other.

4. The condenser structure with a liquid tank according to claim 2, wherein first and second refrigerant passages are formed in said mounting block, each of said first and second refrigerant passages is L-shaped and has a horizontal hole and a vertical hole, and said first refrigerant passage is communicated with said take-in port and said second refrigerant passage is communicated with said second discharging port.

5. The condenser structure with a liquid tank according to claim 1, further comprising: a subcondenser including:
    a pair of end portions of said pair of header pipes;
    a subheat-transferring pipe for communicatively interconnecting said pair of end portions of said header pipes; and
    subfins disposed along said subheat-transferring pipes;
    wherein said condenser, liquid tank and subcondenser are coupled in series of a refrigerant flow direction air- and liquid-tightly.

6. The condenser structure with a liquid tank according to claim 3, further comprising: a subcondenser including:
    a pair of end portions of said pair of header pipes;
    a subheat-transferring pipe for communicatively interconnecting said pair of end portions of said header pipes; and
    subfins disposed along said subheat-transferring pipes;
    wherein said feeding port of said communication block communicates an upstream end of said subcondenser.

7. The condenser structure with a liquid tank according to claim 1, wherein a partitioning wall for partitioning an inside of each of said header pipes and regulating a flowing direction of said liquid refrigerant is provided within said header pipe.

8. The condenser structure with a liquid tank according to claim 3, further comprising a further coupling means provided between said mounting block and connection block.

9. The condenser structure with a liquid tank according to claim 1, wherein said liquid tank has removal means for removing foreign materials from said liquid refrigerant.

10. The condenser structure with a liquid tank according to claim 1, wherein a center axis of said liquid tank is displaced in front of a center axis of said first header pipe.

11. The condenser structure with a liquid tank according to claim 1, wherein said liquid tank is made of metal of good thermal conductivity, and radiating fins for promoting a heat exchange between said liquid tank and air are formed on an outer surface of said liquid tank.

12. The condenser structure with a liquid tank according to claim 8, wherein said coupling means comprises:
    a threaded hole bored in said connection block;
    a through-hole bored in said mounting block and aligned with said threaded hole; and
    a bolt passed through said through-hole and screwed into said threaded hole.

13. The condenser structure with a liquid tank according to claim 11, wherein said radiating fins are formed by means of extrusion molding.

14. The condenser structure with a liquid tank according to claim 11, wherein corrugated fins are soldered to an outer surface of said liquid tank.

15. The condenser structure with a liquid tank according to claim 6, Wherein said case of said liquid tank is made of metal of good thermal conductivity, and radiating fins for promoting a heat exchange between said case and air are formed on an outer surface of said case.

16. The condenser structure with a liquid tank according to claim 15, wherein said radiating fins are formed by means of extrusion molding.

17. The condenser structure with a liquid tank according to claim 15, wherein corrugated fins are soldered to an outer surface of said case of said liquid tank.

* * * * *